US009573305B2

(12) United States Patent
Yuan

(10) Patent No.: US 9,573,305 B2
(45) Date of Patent: Feb. 21, 2017

(54) METHOD AND DEVICE FOR MAKING SILICONE RUBBER CUPPING APPLIANCE

(71) Applicant: Green Island International TCM Group Limited, Hong Kong (HK)

(72) Inventor: Bing Yuan, Beijing (CN)

(73) Assignee: Green Island International TCM Group Limited, Hong Kong (HK)

( * ) Notice: Subject to any disclaimer, the term of this patent is extended or adjusted under 35 U.S.C. 154(b) by 159 days.

(21) Appl. No.: 14/318,708

(22) Filed: Jun. 30, 2014

(65) Prior Publication Data

US 2014/0316307 A1   Oct. 23, 2014

Related U.S. Application Data

(63) Continuation of application No. PCT/CN2012/088000, filed on Dec. 31, 2012.

(30) Foreign Application Priority Data

Dec. 30, 2011 (CN) .......................... 2011 1 0456974

(51) Int. Cl.
*B29C 45/40* (2006.01)
*A61H 9/00* (2006.01)
(Continued)

(52) U.S. Cl.
CPC ......... *B29C 45/4005* (2013.01); *A61H 9/0057* (2013.01); *B29C 45/435* (2013.01);
(Continued)

(58) Field of Classification Search
CPC ............... B29C 45/435; B29C 45/4407; B29C 45/7312; B29C 45/4005; B29C 45/33; B29C 2045/735; B29C 2045/7368; B29C 45/7331
(Continued)

(56) References Cited

U.S. PATENT DOCUMENTS 2,358,857 A * 9/1944 Gits ........................ B29C 45/33
249/161
2,396,406 A * 3/1946 Anderson ........... B29C 37/0003
425/437

(Continued)

FOREIGN PATENT DOCUMENTS

CN   1098284 A   2/1995
CN   201268078 Y   7/2009
(Continued)

OTHER PUBLICATIONS

Search Report of counterpart European Patent Application No. 12861698.4 issued on Jun. 2, 2015.
(Continued)

*Primary Examiner* — Alison L Hindenlang
*Assistant Examiner* — Emmanuel S Luk

(57) ABSTRACT

A device for producing a silicone rubber cupping appliance is provided. The device includes a nozzle, an internal mould core, a separable slide comprising at least two separable slide blocks; and a blowing-demoulding unit. A mould cavity used for moulding the silicone rubber cupping appliance is formed between the slide and the internal mould core. One end of the nozzle is connected to a channel that transports liquid silicone rubber material, and another end of the nozzle is connected to the mould cavity. The blowing-demoulding unit is connected to the mould cavity through a blow duct opening which is set at a contact surface of the internal mould core and the mould cavity.

10 Claims, 5 Drawing Sheets

(51) Int. Cl.
B29C 45/43 (2006.01)
B29K 83/00 (2006.01)
B29C 45/33 (2006.01)
B29C 45/44 (2006.01)
B29L 31/00 (2006.01)

(52) U.S. Cl.
CPC .......... B29C 45/33 (2013.01); B29C 45/4407 (2013.01); B29K 2083/005 (2013.01); B29L 2031/703 (2013.01)

(58) Field of Classification Search
USPC .............................. 425/547, 556, DIG. 246, DIG. 102,425/DIG. 58, DIG. 5
See application file for complete search history.

(56) References Cited

U.S. PATENT DOCUMENTS

| | | | | |
|---|---|---|---|---|
| 3,183,551 A * | 5/1965 | Johnson | ................ | B29C 33/444 425/437 |
| 3,304,354 A * | 2/1967 | Hill, Jr. | .................. | B29C 49/48 16/42 R |
| 3,373,460 A * | 3/1968 | Ladney, Jr. | ............. | B29C 33/48 249/152 |
| 4,198,371 A * | 4/1980 | Holmes | .................. | G07D 9/004 264/297.2 |
| 4,286,942 A * | 9/1981 | Fuzioka | ............. | B29D 30/0661 425/129.1 |
| 4,375,948 A * | 3/1983 | von Holdt | ............... | B29C 45/43 425/437 |
| 4,524,943 A * | 6/1985 | Busch | ..................... | B29C 45/33 249/63 |
| 4,832,307 A * | 5/1989 | Watanabe | ............. | B29C 45/332 249/145 |
| 4,889,480 A * | 12/1989 | Nakamura | ............ | B29C 45/332 425/450.1 |
| 5,236,656 A * | 8/1993 | Nakajima | ............. | B29C 49/061 264/506 |
| 5,490,966 A * | 2/1996 | Peterson | ............... | B29C 45/435 249/63 |
| 5,683,644 A * | 11/1997 | Peterson | ............... | B29C 45/435 249/68 |
| 5,700,415 A * | 12/1997 | Hiroki | ................. | B29C 45/4421 249/152 |
| 5,928,683 A * | 7/1999 | Debenedetti | ............ | B29C 45/38 425/436 R |
| 6,210,624 B1 * | 4/2001 | Mayer | ................... | A61M 39/04 264/318 |
| 6,403,003 B1 * | 6/2002 | Fekete | ..................... | A63H 3/36 264/129 |
| 6,929,462 B1 * | 8/2005 | Andrews | ............... | B29C 33/303 425/450.1 |
| 7,172,721 B2 * | 2/2007 | Wong | ....................... | A63H 9/00 249/183 |
| 2006/0068925 A1 * | 3/2006 | Sueoka | ............. | B29C 45/14336 464/175 |
| 2014/0145372 A1 * | 5/2014 | Ueno | ...................... | B29C 45/33 264/328.1 |

FOREIGN PATENT DOCUMENTS

| | | |
|---|---|---|
| CN | 201798948 U | 4/2011 |
| EP | 0100422 A1 | 2/1984 |
| EP | 0282861 A2 | 9/1988 |
| EP | 1389517 A1 | 2/2004 |

OTHER PUBLICATIONS

Kuroda J: "Mold Designing and Construction for Automation and High Cycle Molding (2)", Japan Plastics Age, Plastics Age Co Ltd. Tokyo, JP, vol. 11, No. 10, Oct. 1, 1973 (Oct. 1, 1973), pp. 11-48, XP001176238.

International Search Report of PCT Patent Application No. PCT/CN2012/088000.

Examination Report of counterpart European Patent Application No. 12861698.4 issued on Nov. 27, 2015.

* cited by examiner

METHOD AND DEVICE FOR MAKING SILICONE RUBBER CUPPING APPLIANCE

CROSS REFERENCE TO RELATED PATENT APPLICATION

This is a continuation application of PCT patent application No. PCT/CN2012/088000 filed on Dec. 31, 2012, which claims priority of Chinese patent application No. 201110456974.7 filed on Dec. 30, 2011, the entire content of which are hereby incorporated by reference.

FIELD OF THE TECHNOLOGY

The present application is related to a method and device for making cupping appliance, and particularly, to a method and device for making silicone rubber cupping appliance.

BACKGROUND

Cupping appliance is a traditional Chinese medical healthcare appliance, which has existed since the old times and offers astounding effects. Traditional cupping appliance normally is made with solid material such as ceramics, bamboo cone, and glass. Suction cupping appliance made with organic glass has also been applied. The cupping appliance made with solid material normally needs ignition or gas sucking so as to allow the internal cavity to form a definite negative pressure, such that suction may be performed on a specific part of a human body. Cupping with ignition may easily cause burns while cupping with suction is not sufficiently convenient in operation. Furthermore, the cupping appliance made with solid material may easily fall off because the skin swells up after cupping. It is difficult to cup the slim muscles and curvy parts, such as the joints, spine and etc. In addition, it is not convenient to carry the cupping appliance.

In recent years, a novel cupping appliance that is made with rubber or silicone rubber has been introduced. Comparing with the cupping appliance made with hard material, the cupping appliance made with rubber or silicone rubber material has the following characteristics:

1) No need to ignite, will not burn a human, easy to learn how to operate and easy to operate;
2) Large cupping force, firm cupping, and the cupping sucking force may be easily adjusted;
3) Since the cup opening is soft and may change shape, joints, spines and other parts with curvy surfaces may also be cupped;
4) No limitation on physical status of the human, may perform cupping while sitting, standing or even walking;
5) Not easily broken, convenient to carry with.

Since the cupping appliance made with rubber or silicone rubber possesses the above mentioned beneficial characteristics, it is favored by medical practitioners and patients.

However, the rubber material applied in current rubber cupping appliance is not transparent. In addition, silicone rubber cupping appliance also may only be semi-transparent due to the limitation in the manufacturing process. Such would affect observations made by the medical practitioners towards the concerned skin parts of the patients. This is also the main deficiency for the rubber elastic cupping.

The current manufacturing technique of the rubber or silicone rubber cupping appliance applies molding technology. The general process for the molding technology is as follows:

After the solid silicone rubber material is mixed through the mixing mill, a mixed film is cut, using a cutting machine, into a size and width suitable for filling a mould cavity. The rubber with weight slightly greater than that of the product is weighted out. Then it is placed inside the mould cavity. The mould is installed on a pressure forming machine, then the pressure forming machine is turned on. The molding is formed under a certain temperature maintained for a duration of time. Finally, the cupping appliance is completed after demoulding. The molding possesses the following deficiencies: First, the production procedure includes rubber mixing, material mixing, material cutting, material weighting, material placing, mould installing, vulcanization moulding, demoulding, and trimming. The production procedure is complicated, time consuming and has low production efficiency. Second, the moulding method is rough and not meticulous, and has difficulty in avoiding bad quality of the product brought about from human operation in the process of moulding. Third, the demoulding is difficult. During the process of demoulding, the cupping appliance may easily be damaged. The damaged rate is high. At the same time, in the process of demoulding, the die needs to be dismounted, which wastes time and energy, and increases the labour force and lengthens the production time.

SUMMARY

In order to solve the above problem, the present application provides a method and device for producing a silicone rubber cupping appliance. Using liquid silicone rubber as the raw material and applying injection of silicone rubber vulcanization moulding technology, a silicone rubber cupping appliance possessing high elasticity, high transparency and complex shapes may be produced. Furthermore, the procedure is simple, the whole process is under automatic operation, the productivity rate is high, the demoulding is simple and fast and the demoulding process does not require the device to be dismounted for cleansing.

TECHNICAL ADVANTAGES OF THE PRESENT APPLICATION

The present application provides a device for producing a silicone rubber cupping appliance. Through the mould cavity formed between the slide and the internal mould core used to mould the silicone rubber cupping appliance, causing the nozzle that input the liquid silicone rubber material and the blowing-demoulding unit to be connected to the mould cavity, respectively. An injection vulcanization moulding device specifically used to produce silicone rubber cupping appliance is formed, so as to enable the manufacture of a silicone rubber cupping appliance with high elasticity, high transparency and complex shapes using liquid silicone rubber as the material and through the injection vulcanization moulding technique. Furthermore, the structure is simple. The separation of the separable slide and internal mould core may realize the automatic operation of the entire process and high productivity rate in the injection moulding. The blowing-demoulding unit enables the demoulding process to be simple and fast. The demoulding process does not require the device to be dismounted for cleansing. The liquid silicone rubber itself possesses better transparency than the solid silicone rubber. The application of the production craft in the present application, with the high precision level and good surface finishing of the mould, may completely solve the problem of the prior known elastic cupping not being transparent and may only be semi-transparent, allowing the silicone rubber cupping appliance produced in the present application to be more favored relative to other same kind of products. The injection moulding by the device for producing the silicone rubber cupping appliance in the present application possesses high precision rate, good fitting capability while the product would not be mis-fitted and does not require trimming and subsequent manual processing.

In a further solution of the present application, the hot flowing channel is provided at the contact surface of the separable slide, which may prevent the solidification of the silicone rubber material from obstructing the hot flowing channel, allowing the automatic cleansing of the solidified silicone rubber in the demoulding process so that independent cleansing procedure towards the hot flowing channel may be eliminated.

A further solution of the present application preferably provides a demoulding device that includes a blow duct and a blow needle, which possesses a conical stand hole of the blow duct with the same conical angle and that may tightly engage with a conical stand structure of the top part of the blow needle, enabling the blow needle to completely seal the blow duct opening under a sealing status. Such may prevent the liquid silicone rubber material from flowing inside the blow duct during injection.

In a further solution of the present application, the top part of the blow needle possesses a shape align to or smoothly transitioned with the internal mould surface lying in proximity to the blow duct opening, which may prevent the location of the blow duct opening from appearing uneven bulges or recesses and avoid those effect on the quality of the product and guarantee the evenness of the silicone rubber cupping appliance after moulding.

In a further solution of the present application, the gas entry channel may separate the entering of the high pressure gas and the controlling of the blow needle, which are controlled respectively by the gas entry channel and the blow duct, so as to simplify the design and lower the demand for the blow duct.

In a further solution of the present application, a sealing pad is provided at a suitable location of the blow duct, which may prevent the high pressure gas from leakage outside.

In a further solution of the present application, the mould board is separable. The mould board is in one piece during injection moulding, which ensures sealing during injection.

During demoulding, the mould board is separable, which ensures the separable slide would not be obstructed by the mould board when separating.

In a further solution of the present application, the insulation board prevents the liquid silicone rubber material from solidifying during the flowing process.

In a further solution of the present application, the internal mould core is separable and/or detachable, easing the processing of the internal mould core and furthermore only the internal mould insert may be replaced when a need to replace the mould arises, which lowers the budget and reduces the maintenance and care time.

In a further solution of the present application, the mould cavity has a gourd shape, allowing the silicone rubber cupping appliance produced to reach a beneficial therapeutic effect. In a further solution of the present application, a width range of the mould cavity is provided. The silicone rubber cupping appliance made with the mould cavity possessing such width range has a relatively better therapeutic effect.

In a further solution of the present application, a cold flowing channel is provided, allowing the site of the entry of the liquid silicone rubber material to be more flexible. The raw material in the cold flowing channel would not solidify, so as to reduce waste of the raw material during the product manufacturing process.

In a further solution of the present application, the insulation device and/or water cooling channel prevent the solidification of the liquid silicone rubber material in the cold flowing channel during flowing.

In a further solution of the present application, the glue sealing needle may ensure the channel where the liquid silicone rubber material needs to flow pass does not contain any silicone rubber residue after the injection of the liquid silicone rubber material is completed, so as to prevent any possible cleansing procedure in the subsequent process.

In a further solution of the present application, a gas pressure blown out by the blowing-demoulding unit is preferably provided, which may speed up the demoulding.

In a further solution of the present application, a method of producing the silicone rubber cupping appliance is provided in which, relative to the traditional pressure moulding craft, the solid rubber used derived from raw material through pressure moulding is replaced by liquid silicone rubber through injection moulding. Since the liquid silicone rubber possesses better liquidity, evenness in filling and absence of dead angles, the imperfect products created due to unevenness in filling of materials during moulding are greatly minimized. The application of the liquid silicone rubber material with the production method in the present application produces a product that is fine, with bright furnishing, aesthetic quality and improved performance. At the same time, the problem of bubbles, pits, scratches, dirts, impurities as such conditions affecting the quality of the product commonly existing in the traditional pressure moulding craft is solved. Such method mixed the rubber with additives before inputting the same as raw material, which may complete a one cycle production and a one cycle vulcanization moulding within several seconds, dispensing with the material mixing, material cutting, weighting, material placing, mould installing etc. procedures that precedes the pressure moulding craft. Furthermore, the adding of materials is precise which greatly saves raw materials while the procedure is simple.

In a further solution of the present application, the separation of the separable slide and the internal mould core realizes an automatic operation with high productivity in the whole process of injection moulding. The blowing-demoulding unit enables the demoulding to be simple and fast. In the demoulding process, the device does not need to be dismounted and cleaned. In comparing it with the pressure moulding craft, the application of such liquid silicone rubber injection craft enables short vulcanization time. If a product with same wall width is applied, the time required for vulcanization is merely a few fraction of that required under the pressure moulding craft. Therefore, the mould cavity number used is also commonly a few fraction of that under the pressure moulding craft, which greatly enhanced the productivity level. The production process basically realized an automatic operation. All procedures only require one worker to monitor the machine. The time and worker required to produce one set of products may be saved at 10 folds or above, and the waste of energy is greatly reduced.

In a further solution of the present application, a preferred demoulding procedure is provided. A convenient and fast demoulding may be performed through such procedure, allowing the device for producing the silicone rubber cupping appliance in the demoulding process does not need to be dismounted for cleansing. The application of the blowing-demoulding method does not have the difficult process of manual demoulding. The demoulding may be completed at quick pace, which greatly raised the productivity rate and avoided the damage caused to the product due to strong mechanical force applied for demoulding. As a result, the damaged product rate is almost zero.

In a further solution of the present application, the procedure of production in cycle is provided, which may supply in set amount and produce under automatic operation the silicone rubber cupping appliance, and raises the productivity level and automatic operation level.

The silicone rubber cupping appliance produced under the device and method in the present application possesses high elasticity, high transparency and complex shapes.

In a further solution of the present application, the silicone rubber cupping appliance is transparent, which may assist the user to clearly observe the skin condition of the patient from the external area, making it convenient to take appropriate therapeutic measures. In a further solution of the present application, the silicone rubber cupping appliance possesses elasticity, which may realize the suction of skin without the need to lighting for producing negative pressure.

1—mould cavity, 2—insulation board, 3—rear mould board, 4—internal mould core, 5—internal mould insert, 6—blowing-demoulding unit, 7—slide, 8—front mould board, 9—pushing rod, 10—panel, 11—nozzle cover, 12—nozzle, 13—heating pipe, 14—gas exit pore, 15—slanted guide pole, 16—blow needle fastening board, 17—cold flowing channel, 18—cooled water pore, 19—cooled water channel, 20—valve, 21—blow duct, 211—blow duct wall, 22—glue sealing needle, 23—blow duct opening, 24—gas pore, 25—internal mould surface, 26—external mould surface, 27—hot flowing channel, 28—gas entry opening, 29—gas entry channel, 30—sealing pad, 41—internal mould core fastening rack, 61—top section of the blow needle, 62—rod section of the blow needle, 71—lower front mould cavity, 72—upper front mould cavity.

DETAILED DESCRIPTION

Below is a detailed description of the specific embodiments of the present application with reference to the drawings.

Figure 1A:
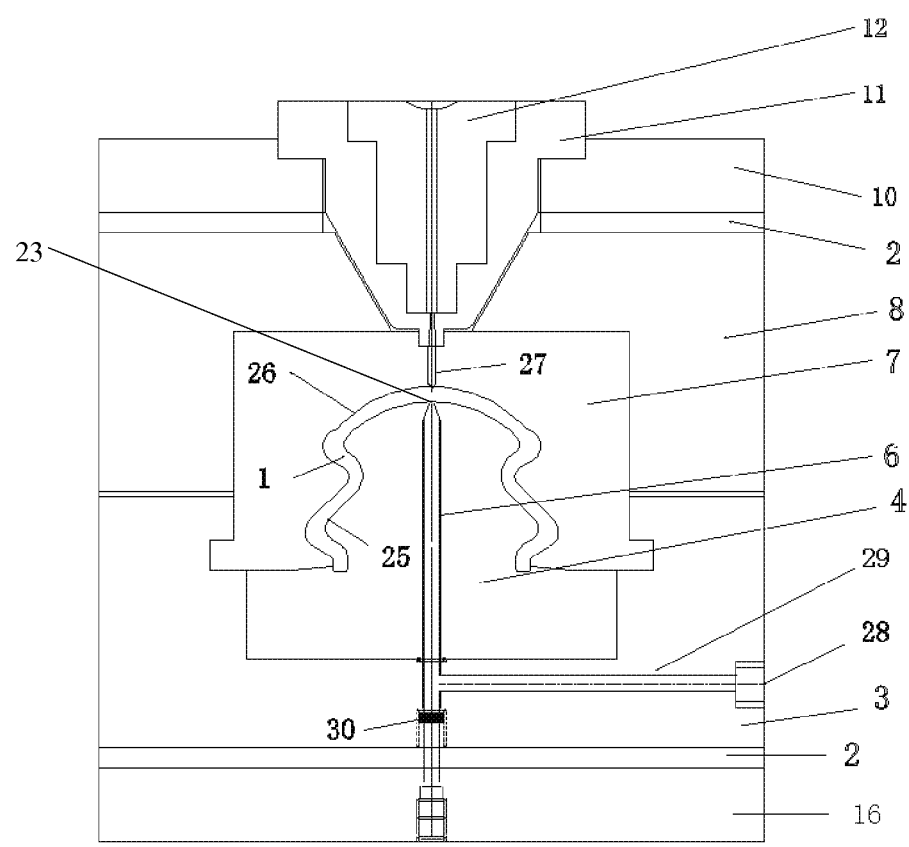
FIG. 1a is an illustrative view of the device according to an embodiment of the present application.
Figure 1B:
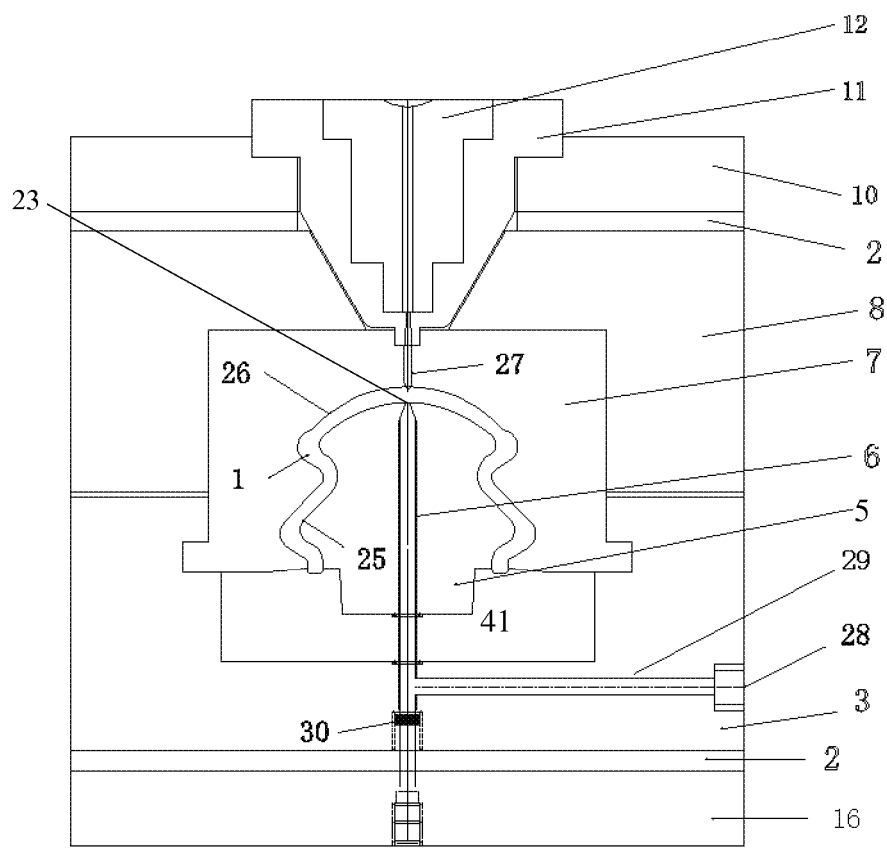
FIG. 1b is an illustrative view of the device according to an embodiment of the present application.
Figure 2:
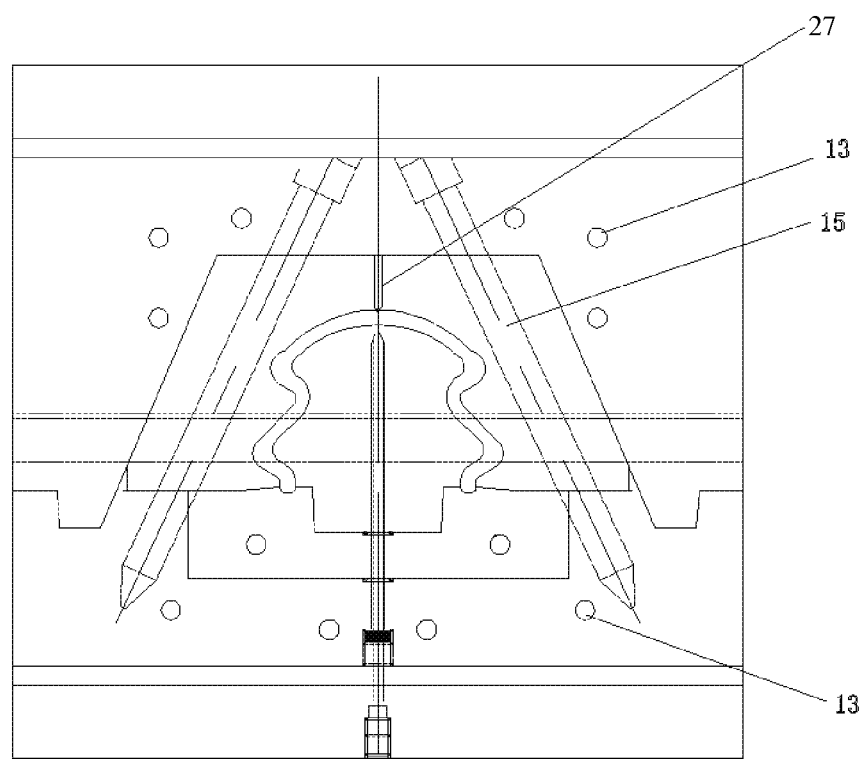
FIG. 2 is a side view of FIG. 1b.

A device for making silicone rubber cupping appliance, as illustrated in FIGS. 1a, 1b and 2, includes a nozzle 12 (or known as the sprue), an internal mould core 4, a separable slide 7 (may also be known as a sliding block or front mould or external mould), and a blowing-demoulding unit 6. The blowing-demoulding unit 6 is used for blowing demoulding. The slide 7 includes a recess. The slide includes at least two separable slide blocks. The internal mould core includes a projection. The projection of the internal mould core 4 and the recess of the slide 7 form a mould cavity 1 for moulding the silicone rubber cupping appliance. The blowing-demoulding unit 6 connects to the mould cavity 1 through the blow duct opening 23 located at the contact surface of the internal mould core 4 and the mould cavity 1. One end of the nozzle 12 connects to the channel that transports the liquid silicone rubber material. Another end connects to the mould cavity 1. In other word, the liquid silicone rubber material is injected into the mould cavity 1 through the nozzle 12, allowing it to solidify and be moulded under a vulcanizing temperature. That is, the silicone rubber cupping appliance may be produced within the mould cavity 1. It is emphasized that in the present application, liquid silicone rubber and liquid additive must be mixed sometimes when needed. Then, they are inputted into the mould cavity 1. Therefore, the "liquid silicone rubber material" in the present application also includes the mixture which is obtained by mixing the liquid silicone rubber and the liquid additive.

The end of the nozzle 12 that is used to input the liquid silicone rubber material may also connect to the cold flowing channel 17. Liquid silicone rubber material is inputted through the cold flowing channel 17. That is, the liquid silicone rubber material is inputted into the nozzle 12 through the cold flowing channel 17. Then another end of the nozzle 12 injects the liquid silicone rubber material into the mould cavity 1.

In order to prevent obstruction during injection moulding by the nozzle 12, the nozzle 12 may also connect to the mould cavity 1 through a hot flowing channel 27. The location of the hot flowing channel 27 may be provided on certain slide block. However, preferably, the hot flowing channel 27 is provided on the flowing channel connecting the nozzle 12 and the mould cavity 1. The hot flowing channel 27 is a flowing channel formed from the contact surface between the slide blocks in a combination condition. When the slide block needs to separate (or break up) during demoulding, the at least two slide blocks separate from each other and may allow the external mould surface 26 and the hot flowing channel 27 of the silicone rubber cupping appliance in the mould cavity 1 to be exposed in the air, easing the subsequent demoulding. Further, this prevents the forming of solidified rubber in the nozzle 12 obstructing subsequent automatic production. The external mould surface 26 refers to the contact surface of the silicone rubber cupping appliance and the slide 7 in the mould cavity 1, as illustrated in FIGS. 1a and 1b. The shape of the mould cavity may be in a gourd shape as illustrated in FIGS. 1a and 1b. The blow duct opening 23 locates at the top central part of the gourd shape and connects to the mould cavity 1. Obviously, it may also be in other shapes. Upon clinical testing, the silicone rubber cupping appliance in gourd shape offers an excellent therapeutic effect.

The slide 7 in the present application may separate along a direction vertical to the axis of the silicone rubber cupping appliance. Obviously, it may separate in a direction at a definite angle from the axis of the silicone rubber cupping appliance. It may also be a plurality of separable slides provided along the axis of the mould cavity 1, and lie distal from the mould cavity 1 along the axial direction of the mould cavity 1. This way, the external mould surface 26 of the silicone rubber cupping appliance in the mould cavity 1 may also be exposed in the air. If at this moment, a hot flowing channel 27 is available, then the hot flowing channel 27 may be provided on the contact surface between the two slide blocks. The internal mould core 4 may be a one piece structure, as illustrated in FIG. 1a. It may also be a detachable structure formed by an internal mould insert 5 and an internal mould core fastening rack 41, as illustrated in FIG. 1b, which may ease processing and mould change according to the shape or size of the silicone rubber cupping appliance to be produced. The device for producing the silicone rubber cupping appliance may also include a heating device that heats the liquid silicone rubber material causing it to vulcanization moulding, such as a heating pipe 13. It is emphasized that, for the liquid silicone rubber injection moulding craft, a heating device is necessary for the device that produce the silicone rubber cupping appliance. The heating device may be installed within the device that produce the silicone rubber cupping appliance and forms a part of such device. However, such heating device does not need to be integrated with the device that produces the silicone rubber cupping appliance. Other external heating apparatus may be used to provide heat energy. For the latter situation, the device that produce the silicone rubber cupping appliance may does not include a heating device. The heating device may be a heating pipe 13, or a heating device in other forms, such as a heating film, a heating panel etc. In the below embodiment, the heating device is a heating pipe 13. But it should note that the below embodiment does not impose any limitation on the heating device. The heating pipe 13 may be installed within the mould board (such as within the front mould board 8 and/or the rear mould board 3). It may also be installed within the internal mould core 4 and/or the slide 7. The end part of the blowing-demoulding unit 6 (or the part of the blowing-demoulding unit 6 that lies in proximity to the external part of the device that produce the silicone rubber cupping appliance) may connect to the high pressure gas source. The blowing-demoulding unit 6 may also include a blowing-demoulding unit fastening board 16 at its end for its own fastening and controlling.

Figure 4:
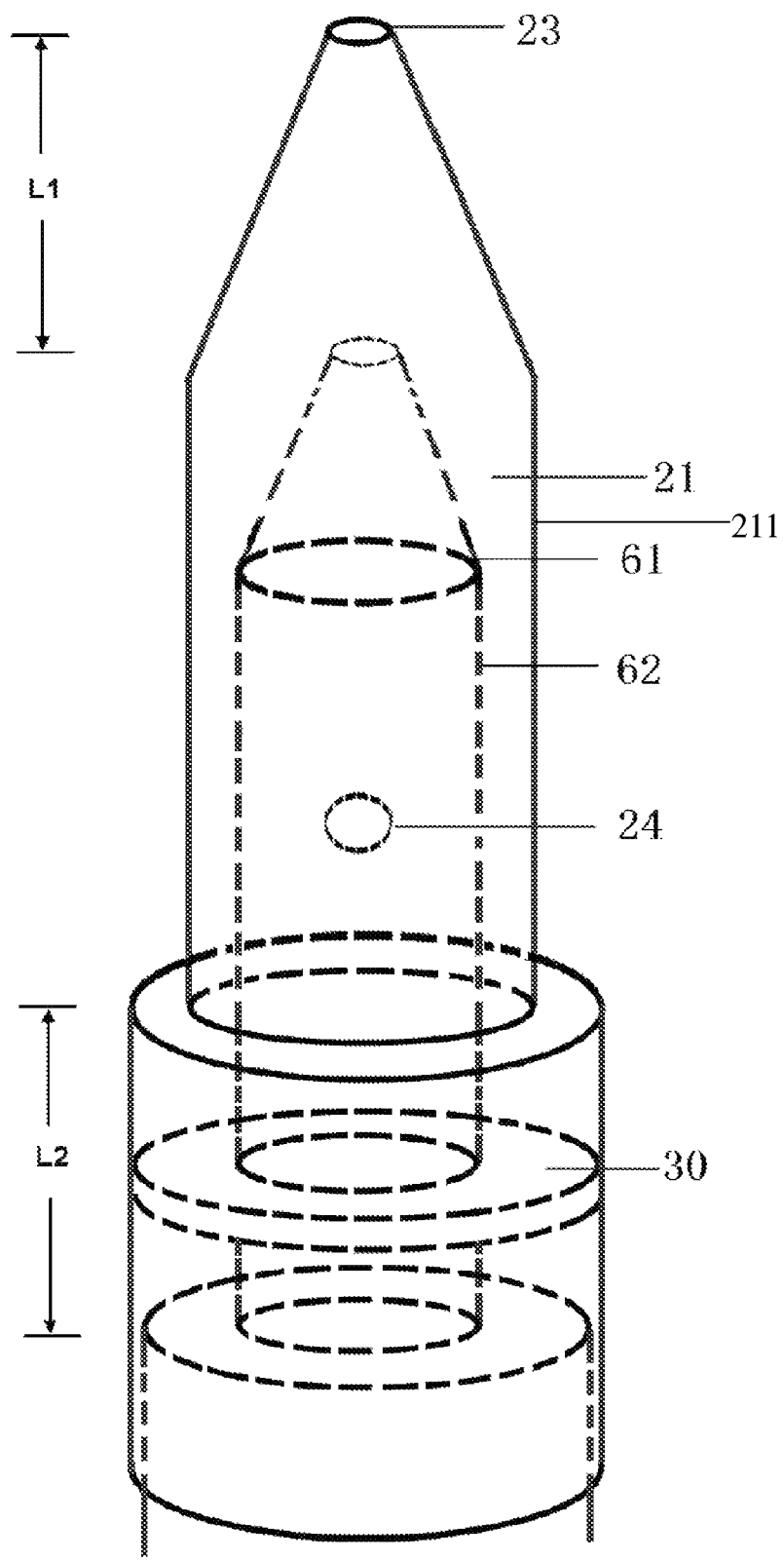
FIG. 4 is an illustrative view of a blowing-demoulding unit according to an embodiment of the present application.

The blowing-demoulding unit 6 includes a blow duct 21, as illustrated in FIG. 4. One end of the blow duct 21 is a blow duct opening 23 which is connected to the mould cavity 1. The blowing-demoulding unit 6 also includes a blow needle which is located within the blow duct 21 and controls the opening and closing of the blow duct opening 23. The blow duct 21 has a conical stand hole in proximity to the blow duct opening 23. The cross-section diameter of the conical stand hole lying in proximity to the blow duct opening 23 is less than the cross-section diameter of the conical stand hole lying distal to the blow duct opening 23. The blow needle includes a central hollow rod section 62 and a top section 61 that lies in proximity to the blow duct opening 23. The central hollow part at the rod section 62 has a gas pore 24 that connects to the blow duct 21. The top section 61 is a conical stand structure that has the same conical angle as that of the conical stand hole of the blow duct 21. The top section 61 may tightly engage with the conical stand hole of the blow duct 21. In other word, when the top section 61 of the blow needle arrives at the blow duct opening 23, the external conical surface of the conical stand structure of the blow needle top section 61 may tightly fit with the internal conical surface of the conical stand hole that lies in proximity to the blow duct opening 23 of the blowing pore channel 21. Such may ensure that during the injection moulding process, when the blow needle top section 61 blocks the blow duct channel opening 23 (that is when the conical stand hole of the blow duct 21 positions the conical stand structure of the blow needle top section 61), the mould cavity 1 may be completely sealed (completely closed), rendering the liquid silicone rubber to be unable to flow inside the blow duct 21 through the blow duct channel opening 23. During the demoulding process, the blow needle departs from the mould cavity 1 along the blow duct 21, causing the blow duct channel opening 23 to open, so as to allow the blow duct 21 to be connected to the mould cavity 1. At this moment, the high pressure gas may enter into the mould cavity 1 through the blow duct 21. The conical stand hole and the conical stand in the conical structure may be round stands that are mutually positioned and corresponded, and may also be oval stands or prismatic stands (such as three-prismatic stand, four-prismatic stand, six-prismatic stand etc).

The blow duct 21 is provided within the internal mould core 4. The internal wall of the central hollow structure of the internal mould core is a blow duct wall 211 (as illustrated in FIG. 4). The top surface of the top section 61 of the blow needle is in a shape that is aligned to or smoothly transitioned with the internal mould surface 25 that lies in proximity to the blow duct opening 23 of the mould cavity 1. For example, if the internal mould surface 25 is a flat surface or mini-curved surface according to the continuous nature of the surroundings of the internal mould surface 25, as illustrated in FIG. 1*a*, then the shape of the top surface of the top section 61 of the blow needle should be a flat surface or mini-curved surface as mentioned above. Such may prevent uneven bulges or depressions appearing at the location of the blow duct opening 23, so as to prevent affecting the quality of the product. It may ensure the evenness of the silicone rubber cupping appliance after moulding. The internal mould surface 25 refers to the contact surface between the internal mould core 4 and the silicone rubber cupping appliance in the mould cavity 1, as illustrated in FIGS. 1*a* and 1*b*.

The blowing-demoulding unit 6 may also include a gas entry channel 29 that transport gas into the blow duct 21, as illustrated in FIGS. 1*a* and 1*b*. One end of the gas entry channel 29 connects to the high pressure gas source through the gas entry opening 28. Another opening end of the gas entry channel 29 is provided within the central hollow section of the blow needle. In the blowing-demoulding process, the high pressure gas enters the blow duct 21 through the gas entry channel 29, and then enters inside the mould cavity 1 through the blow duct opening 23. In order to prevent the high pressure gas when entering the blow duct 21 through the gas entry channel 29 from leaking at the lower side of the blow duct 21 as shown in FIGS. 1*a* and 1*b*, the blow duct 21 at the external part of the conical stand hole is a pipe channel including two sections with changing diameter. The section that lies in proximity to the conical stand hole is a small diameter section. A sealing pad 30 with an opening pore at the center and that prevents the leakage of the high pressure gas is provided inside the large diameter section, as illustrated in FIGS. 1*a*, 1*b* and 4. The outer edge of the sealing pad 30 tightly fits with the internal wall of the blow duct 21. The inner edge at the central opening pore tightly fits with the external wall of the rod section of the blow needle 62, so as to prevent the high pressure gas from leaking outside.

In order to ensure the liquid silicone rubber would not leak into the blow duct 21 during the injection moulding, the end part of the rod section of the blow needle 62 may be provided with a projected stand. The end of the blow duct 21 is provided with an internal projected stand. The projected stand of the end part of the rod section of the blow needle 62 and the internal projected stand of the end part of the blow duct 21 are mutually matched. A sealing pad 30 is installed between these two parts. As illustrated in FIG. 4, the part of the blow duct 21 external to the conical stand hole is a pipe channel with two path changing sections. The section that lies in proximity to the conical stand hole is the small diameter section. A sealing pad 30 with an opening pore at the center and that prevents leakage of high pressure gas is provided at the large diameter section, used for sealing the gap during fitting of the blow needle with the blow duct 21 in the moulding process. Obviously, the blowing-demoulding unit 6 may be other structures which seal the blow duct 21 when moulding and connect the blow duct 21 and the mould cavity 1 when demoulding. It is emphasized that when the top surface of the top section of the blow needle 61 tightly seals with the blow duct opening 23, the part of the end of the rod section of the blow needle 62 possessing the projected stand and the internal projected stand of the end of the blow duct 21 tightly press the sealing pad 30 that lies therebetween. Therefore, when the rod section of the blow needle 62 is pulled out, causing the top section of the blow needle 61 to separate from the blow duct opening 23, the distance L1 between the top section of the blow needle 61 and the blow duct opening 23 is less than the distance L2 between the projected stand of end of the rod section of the blow needle 62 and the internal projected stand of the end of the blow duct 21. The difference between the L2 and L1 is slightly less than the width of the sealing pad 30. So that when L1=0, or when the top surface of the top section of the blow needle 61 and the blow duct opening 23 are sealed, the sealing pad 30 which is being pressed along the axial direction may seal the gap between the projected stand of the end of the rod section of the blow needle 62 and the internal projected stand of the end of the blow duct 21, bringing a sealing effect.

The present application mainly describes that the blowing-demoulding unit 6 includes the blow duct opening 23, blow duct 21 and the blow needle. It cannot be taken as imposing any limitations on the blowing-demoulding unit 6. The pressure of the high pressure gas blown out by the blowing-demoulding unit is preferably at 6-7.5 atm, which may successfully demould the moulded silicone rubber cupping appliance.

The number of the mould cavity 1 of the device for producing silicone rubber cupping appliance may be two or more.

Figure 3:
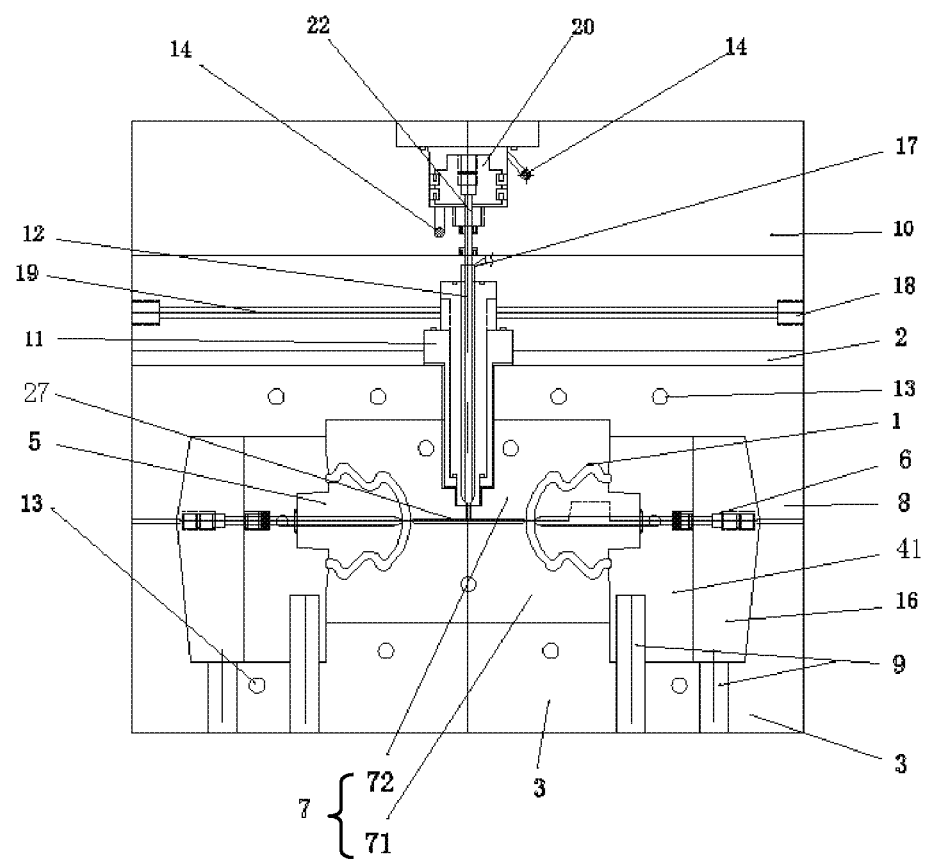
FIG. 3 is an illustrative view of the device according to an embodiment of the present application.

The device for producing the silicone rubber cupping appliance may also include a mould board that is used to secure and/or enfold the slide and internal mould core. The mould board may include a front mould board 8 and a rear mould board 3. The mould board may also be separable. At least, the part of the mould board that enfolds and/or secures the slide is separable. Normally, the mould board may be split into the mutually separable front mould board 8 and rear mould board 3. For example, according to FIGS. 1a and 1b, the separable front mould 8 enfolds and supports the slide 7. Therefore, in this embodiment, the front mould board 8 is itself separable, while the rear mould board 3 only needs to be separable with the front mould board. However, the part of the mould board that enfolds the slide 7 may also be in other status. For example, as illustrated in FIG. 3, the slide 7 is enfolded by half of front mould board 8 and half of rear mould board 3. Therefore, in FIG. 3, the front mould board 8 and rear mould board 3 surrounding the slide 7 is separable. Each of the front mould board 8 and the rear mould board 3 may be separated into two parts. In FIG. 1a, the separating direction of the separable front mould board 8 itself may be along the paralleled or approximately paralleled separating direction relative to the slide 7 (the separating direction of the slide 7 is left and right separated, and the separating direction of the separable front mould board 8 is also left and right separated). It may also move in other directions that are distal from the slide (such as the separable front mould board 8 may separate along an upper left or upper right direction, respectively). In FIG. 3, each of the half of the front mould board and the rear mould board enfolds the slide. Therefore, in FIG. 3, the front mould board 8 and the rear mould board 3 separate along a separating direction that is paralleled or approximately paralleled relative to the slide, respectively (that is separating in an up and down direction as illustrated in FIG. 3), allowing the separation of the slide to be free from limitation.

The device for producing the silicone rubber cupping appliance may also include at least one insulation board 2 that insulates the moulding zone. The moulding zone is a zone formed at least by the slide 7, internal mould core 4 and mould cavity 1 used for moulding. Under the condition of the device possessing the front mould board 8 and rear mould board 3, the moulding zone may also include a front mould board 8 and rear mould board 3. The moulding zone requires heating and heat preserving in the process of injection moulding. The liquid silicone rubber may only maintain the liquid form under a relatively low temperature. Therefore, the moulding zone must necessarily be insulated from the cold flowing channel 17 in which the liquid silicone rubber material flows pass through the insulating material or insulation board 2.

The internal mould core 4 may be separable and/or detachable. The internal mould core 4 includes an internal mould insert 5 and an internal mould core fastening rack 41, as illustrated in FIGS. 1b, 2 and 3. In particular, the internal mould insert 5 possesses an insertion structure. The internal mould core fastening rack 41 possesses a slot structure. The insertion structure and the slot structure correspond with each other. "Separable" refers to the internal mould insert 5 and the internal mould core fastening rack 41 being separable. "Detachable" refers to the internal mould insert 5 and/or the internal mould core fastening rack 41 being able to be detached from and installed on other components which they connect, such as the rear mould board 3.

The device for producing the silicone rubber cupping appliance may also include a glue sealing needle 22. One end of the glue sealing needle 22 connects to the high pressure gas source. Another end connects to the cold flowing channel 17. The high pressure gas source of the glue sealing needle 22 may be the same gas source as the high pressure gas source of the blowing-demoulding unit 6. The high pressure gas source may be an external gas source. The high pressure gas source may also be provided in the internal part of the device that produce the silicone rubber cupping appliance.

Below is a description of the embodiment of the method for making the silicone rubber cupping appliance using the above device for producing the silicone rubber cupping appliance.

The first embodiment of the method for making the silicone rubber cupping appliance includes the following steps:

Step 1): heating the moulding zone and cooling the channel that input where the liquid silicone rubber material flows pass, such as the nozzle 12 (namely, the channel which is inputted with liquid silicone rubber material), or cooling the zone surrounding such channel with the liquid silicone rubber material. If the channel where the liquid silicone rubber material may flow pass includes the cold flowing channel 17, then the cool flowing channel 17 must also be cooled, so as to prevent the liquid silicone rubber material from heating up and vulcanization moulding in the transport process. Such liquid silicone rubber material may include a liquid additive that must be added into the liquid silicone rubber. Therefore, the liquid silicone rubber material including the liquid additive may also be named as the liquid silicone rubber material. The moulding zone includes a slide 7, an internal mould core 4 and a mould cavity 1 formed from the slide 7 and internal mould core 4, as illustrated in FIG. 1a. The method of heating up the moulding zone may performed through the heating device installed at the moulding zone, such as the heating pipe 13 or heating panel or heating film which supplies the energy. Energy may also be supplied through external heating devices. The energy supplied should to the most extent allow each part of the moulding zone to maintain the same or similar temperature. Such way, each part of the silicone rubber cupping appliance in the mould cavity 1 may possess a balanced quality.

Step 2): injecting the liquid silicone rubber material into the mould cavity 1, such as the liquid silicone rubber material may be injected into the mould cavity 1 through the nozzle 12, and/or cold flowing channel 17, and/or hot flowing channel 27.

Step 3): ceasing the addition of materials, and preserving heat for a duration of time, so as to allow the liquid silicone rubber material to vulcanization solidifying and moulding.

Step 4): separating the separable slide 7, at the same time opening the blow duct opening 13. The blowing-demoulding unit 6 blows the silicone rubber cupping appliance in the mould cavity 1 causing it to be demoulded. If the blowing-demoulding unit 6 is mainly formed by the blow duct opening 23, blow duct 21 and the blow needle as illustrated in FIG. 4, then the blow duct opening 23 and the mould cavity 1 are connected through the retreating of the blow needle, then the mould cavity 1 is being blown with high pressure gas by the high pressure gas source through the blow duct 21, so as to allow the silicone rubber cupping appliance to demould after moulding. In FIG. 4, the high pressure gas flows inside the mould cavity 1 through the gap at the sideway of the blow duct 21.

In particular, step 4) may preferably include the following specific steps:

Step 4.1): separating the separable slide 7 at the two sides along a direction lying vertical or approximately vertical to the mould cavity 1, causing an external mould surface 26 of the silicone rubber cupping appliance in the mould cavity 1 to be exposed in the air. Obviously, it may also be a plurality of separable slides provided along the axial direction of the mould cavity 1 lying distal from the mould cavity 1 along the axial direction of the mould cavity 1. At the same time, the external mould surface 26 of the silicone rubber cupping appliance in the mould cavity 1 may be exposed in the air.

Step 4.2): Opening the blow duct opening 23 in the blowing-demoulding unit 6, causing the blowing-demoulding unit 6, such as the blow duct 21 illustrated in FIG. 4, to connect to the mould cavity 1. In FIG. 4, the blowing-demoulding unit 6 is mainly formed by the blow duct opening 23, blow duct 21 and the blow needle. That is, the internal mould core 4 and the silicone rubber cupping appliance under vulcanization solidifying and moulding inside the mould cavity 1 move relatively together in an opposite direction relative to the blow needle (In FIG. 4, the blow needle moves in a downward direction, the internal mould core 4 and the silicone rubber cupping appliance move together in an upward direction). A gap is formed between the blow needle and the internal mould surface 25 of the mould cavity 1.

Step 4.3) of blowing-demoulding: the high pressure gas source blows out high pressure gas from the internal mould surface 25 of the mould cavity 1 through the blow duct 21 and the blow duct opening 23 of the blowing-demoulding unit 6, causing the solidified silicone rubber cupping appliance to detach from the internal mould surface 25. The pressure of the high pressure gas is preferably at 6-7.5 atm, which may speedily and smoothly blows out the moulded silicone rubber cupping appliance.

If the product is produced under automatic operation in batches, step 5) may also be included: production in cycle: repeating steps 2) to 4).

If the mould board is separable as mentioned above, then step 4.1) would be changed to: separating the separable mould board (including the front mould board 8 separating automatically as illustrated in FIGS. 1a and 1b, or the front mould board 8 and the rear mould board 3 separating as illustrated in FIG. 3, obviously, it may include situations where other types of mould board separating), causing the separable slide 7 to separate at two sides along the direction lying vertical to or approximately vertical to the axial of the mould cavity, allowing the external mould surface 26 of the silicone rubber cupping appliance in the mould cavity 1 to be exposed in the air.

The above method of producing silicone rubber cupping appliance may also include a glue sealing needle 22. One end of the glue sealing needle 22 connects to the high pressure gas source. Another end connects to the channel where the liquid silicone rubber material must flow pass, such as the cold flowing channel 17 or the nozzle 12. At this moment, the glue sealing process may also include step 2A) after step 2): stopping the liquid silicone rubber material flowing inside the channel, such as the cold flowing channel 17 and/or the nozzle 12, causing the high pressure gas to rush into the channel through the glue sealing needle 22 and rush out the liquid silicone rubber material residue from the channel.

According to the above method of producing the silicone rubber cupping appliance, one or more than one silicone rubber cupping appliances may be produced simultaneously. For example, two, three, four, five, six, eight silicone rubber cupping appliances may be produced simultaneously. Obviously, much more of the silicone rubber cupping appliance products may be produced at the same time.

Second Embodiment of the Method of Producing Silicone Rubber Cupping Appliance:

The second embodiment of the method of producing the silicone rubber cupping appliance is described as below. The method of the second embodiment produces one silicone rubber cupping appliance at a time In combination with the drawings (mainly referring to FIGS. 1a, 1b and 2), the method of the second embodiment includes the following steps:

Step 1): such step is the same as that in the first embodiment. The internal mould core 4 may also be detachable and is formed by the internal mould insert 5 and the internal mould core fastening rack 41, so as to ease the processing of the internal mould core 4, and may only replace the internal mould insert 5 when a need to replace the mould arises. Such may lower the budget and reduce the maintenance and caring time. The moulding zone also includes an internal mould insert 5 and an internal mould core fastening rack 41. The mould cavity 1 is formed from the zone between the internal mould core fastening rack 41, internal mould surface 25 of the internal mould insert 5 and the external mould surface 26 of the slide 7, as illustrated in FIG. 1b. Heating pipe 13 may be installed at the front mould board 8 and rear mould board 3 for the heating of the moulding zone, heating pipe 13 may also be installed in the internal mould core 4 and/or slide 7 for heating, such as heating pipe 13 is installed on the internal mould core fastening rack 41 as illustrated in FIG. 2 and heating pipe 13 is installed in the slide 7 as illustrated in FIG. 3.

While heating, the cold flowing channel 17 needs to be cooled. Since the liquid silicone rubber would speed up those vulcanization solidifying and moulding when those temperature reaches 90° C. or above, in order to ensure the liquidity of the liquid silicone rubber in the subsequent process of materials adding, the cold flowing channel 17 needs to be cooled, causing those temperature to be lower than 50° C. The critical cooling zone of the cold flowing channel 17 lies in proximity to the cold flowing channel 17. However, in actual situation, an insulation board 2 is also installed between the panel 10 and/or the blowing-demoulding unit fastening board 16 and the moulding zone so as to cause the zone around the panel 10 and/or the blowing-demoulding unit fastening board 16 to maintain at a relatively low temperature, as illustrated in FIGS. 1a, 1b and 3. The insulation board 2 may be other forms of insulation boards that are heat resistant foam plastics or that are applied in industries, such as asbestos board etc. In the embodiment, the method of cooling with water at the zone close to the circumference of the cold flowing channel 17 is applied. The specific cooling example may be seen in FIG. 3. Cooled water is lead into the cooled water channel 19 through the cooled water pore 18 connected to the external cooled water source, and cooling of the cold flowing channel 17 and/or the panel 10 is undergone. Obviously, cooling of the blowing-demoulding unit fastening board 16 may be undergone, as illustrated in FIGS. 1a and 1b, so as to prevent the operator when operating manually would not be burned. A insulation board 2 is installed between the panel 10 and the blowing-demoulding unit fastening board 16 and the moulding zone, so that the zone around the panel 10 and the blowing-demoulding unit fastening board 16 may also maintain at a relatively low temperature, as illustrated in FIGS. 1a, 1b and 3. The insulation board 2 may be formed from heat resistant materials such as heat resistant electronic wooden board or asbestos board.

Step 2): injecting liquid silicone rubber material into the mould cavity 1 through the cold flowing channel 17, nozzle 12 and hot flowing channel 27, as illustrated in FIG. 1a. In FIG. 1a, only the part of the front end of the cold flowing channel 17, that is, the nozzle 12 (or sprue) and the nozzle cover 11 that insulate and protect the nozzle 12 are illustrated. The liquid silicone rubber material is injected into the mould cavity 1 through the hot flowing channel 27 pre-set within the slide 7 where the nozzle 12 passes by. Upon injection, the liquid silicone rubber material ceases from injecting.

Step 3): after ceasing the addition of materials, heat preserving for a duration of time is needed, allowing the liquid silicone rubber to vulcanization solidifying and moulding. The heat preserving time is determined by the amount of liquid silicone rubber injected inside the mould cavity 1. When the amount of liquid silicone rubber injected is relatively large, the heat preserving time needs to be longer. For example, for the relatively large silicone rubber cupping appliance (such as the internal diameter of the opening being 66 mm and external diameter of the opening being 78 mm), since only one product is produced from one process, the heat preserving time needs to be 20 seconds to 40 seconds. For the relatively small silicone rubber cupping appliance (such as the internal diameter of the opening being 50 mm and external diameter of the opening being 60 mm), since two products may be produced in one process, the amount of liquid silicone rubber injected is greater. Therefore, the heat preserving time is relatively longer, and may be warmed for 1 minute to 1.5 minutes. For the even smaller silicone rubber cupping appliance (such as the internal diameter of the opening being 30 mm to 40 mm and external diameter of the opening being 40 mm to 50 mm), 4 to 8 or even more silicone rubber cupping appliance products may be formed from one process, the heat preserving time may be controlled according to the amount of silicone rubber injected.

Step 4):

Step 4.1): Since the silicone rubber cupping appliance is normally an axisymmetric structure, the mould cavity 1 is also axisymmetric. The separable front mould board 8 and the slide 7, under the push by the slanted guide pole 15 (please see FIG. 2), separate at two sides along a direction lying vertical or approximately vertical relative to the axial direction of the mould cavity 1 (in FIGS. 1a and 1b, they are left and right directed), causing the external mould surface 26 of the solidified silicone rubber cupping appliance in the mould cavity 1 and the silicone rubber solidified in the hot flowing channel 27 to be exposed in the air. In particular, the separating method of the separable front mould board 8 may be separating consistently with the separating direction of the slide 7 (such as the situation in FIG. 1a, which refers to left and right separating). The separating method of the separable front mould board 8 may also be in upward and downward separation of the front mould board 8 as a whole and the slide 7 (such as in FIGS. 1a and 1b, the front mould board 8 and the nozzle 12 together move in upward direction, causing the front mould board 8 and the slide 7 as a whole to separate, that is to say, under such situation, the front mould board 8 that enfolds the mould board part of the slide 7 may be in one non-separating piece). The separating method of the separable front mould board 8 may also be in upward and downward separation of the front mould board 8 and the rear mould board 3 as illustrated in FIG. 3 (at this time, the front mould board 8 and the upper front mould cavity 72 move together; the rear mould board 3 and the lower front mould cavity 71 move together, these two parts mutually separate). Obviously, the front mould board 8 may also be a one piece structure instead of a separable structure. At this time, it would be permissible as long as the front mould board 8 and the slide 7 separate without interfering with the separation of the slide 7 by itself.

Step 4.2): If the blowing-demoulding unit 6 includes a blow duct 21, a blow duct opening 23 and a blow needle, as illustrated in FIG. 4, the internal mould core 4 and the silicone rubber cupping appliance solidified in the mould cavity 1, relative to the blow duct 21 that passes through the internal mould core 4, together move correspondingly along the axial direction of the blow duct 21 that passes through the internal mould core 4. Obviously, the blow duct may also be curved. Under the situation of FIG. 1a, the internal mould core 4 and the silicone rubber cupping appliance solidified inside the mould cavity 1 move in an upward direction together. Under the situation of FIG. 1b, the internal mould core 4 is detachable and is formed by the internal mould insert 5 and internal mould core fastening rack 41. That is, the internal mould insert 5 and the internal mould core fastening rack 41 move in an upward direction together with the silicone rubber cupping appliance solidified inside the mould cavity 1. The blowing-demoulding unit fastening board 16 and the blow needle secured above the same maintain without motion. Therefore, in FIG. 1a, the internal mould core 4 and the silicone rubber cupping appliance solidified inside the mould cavity 1 together, relative to the blow needle (the blow needle is secured on the blowing-demoulding unit fastening board 16 and passes through the internal mould core 4), move in opposite and along the axial direction of the blow duct 21, so that a gap is formed between the blow needle and the top part inside the silicone rubber cupping appliance 1. Such gap may be only a few millimeter long, however, this is sufficient to enable the blow duct opening 23 to connect to the mould cavity 1, so that subsequent blowing-demoulding is possible.

Step 4.3): blowing out high pressure gas (the pressure is preferably set at 6-7.5 atm) from the inner top part of the internal mould surface 25 of the silicone rubber cupping appliance that underwent vulcanization moulding through the blowing-demoulding unit 6. The upwardly moving high pressure gas flows along the internal surface of the silicone rubber cupping appliance, rendering those hot, solidified silicone rubber cupping appliance to detach from the internal mould surface 25, and is blown inside a container (such as a basket), so as to complete the production and demoulding of one or a batch of silicone rubber cupping appliances.

Step 5): repeating the above steps 2) to 4) and reaching the production in batches and under automatic operation.

Third Embodiment of the Method of Producing Silicone Rubber Cupping Appliance:

If the productivity rate needs to be increased, then a plurality of silicone rubber cupping appliances need to be produced in one single process, such as producing in two, three, four, five, six, eight products etc at one time. Referring to FIG. 3, the third embodiment is described taking the production of two silicone rubber cupping appliances at one time as an example.

The preheating and cooling protection process in step 1) of the third embodiment and step 1) of the first embodiment are the same.

In step 2), due to the increase in number of the silicone rubber cupping appliance, the amount of liquid silicone rubber to be used would be greater. Therefore, after adding the materials, the glue sealing process through the glue sealing needle 22 is necessary in order to prevent the liquid silicone rubber in the cold flowing channel 17 from flowing out. The glue sealing process is specifically as follows:

2A) Glue sealing process: provided with a glue sealing needle 22. One end of the glue sealing needle 22 connects to the high pressure gas source through the gas exit pore 14, such as a cylinder (the cylinder is used to provide high pressure gas source, which is not shown in the drawings), another end of the needle head connects to the cold flowing channel 17 or the nozzle 12, extending within the cold flowing channel 17 or the nozzle 12. After the addition of materials, valve 20 is closed to cease the liquid silicone rubber to flow inside the cold flowing channel 17, then the cylinder is opened to allow the high pressure gas to rush inside the cold flowing channel 17 and/or nozzle 12 through the gas exit pore 14 and glue sealing needle 22. On the one hand, the liquid silicone rubber residue in the cold flowing channel 17 or the nozzle 12 is rushed out the cold flowing channel 17 or nozzle 12, preventing the vulcanization solidifying of the liquid silicone rubber inside the cold flowing channel 17 or the nozzle 12, so that cleansing of the cold flowing channel 17 and nozzle 12 is avoided. On the other hand, a gas column is formed in the cold flowing channel 17 or nozzle 12. After the nozzle 12 closes, the gas pressure such gas column produced may also prevent the liquid silicone rubber at the end part of the cold flowing channel 17 from flowing inside the cold flowing channel 17 and nozzle 12 and causing contamination. The high pressure gas source that connects with the glue sealing needle 22 may be the same gas source as the high pressure gas source of the blow needle. Obviously, they may be two different high pressure gas sources.

In the vulcanization process in step 3), as mentioned above, the heat preserving time needs to be extended reasonably according to the amount of liquid silicone rubber. For the situation of the production of two silicone rubber cupping appliances in one single process as illustrated in FIG. 3, one minute to 2 minutes should be maintained.

The slide 7 of the embodiment in FIG. 1b is divided into left and right two parts. The slide 7 of the embodiment in FIG. 3 is divided into up and down two parts of the lower front mould cavity 71 and the upper front mould cavity 72. The internal mould core 4 is detachable and is formed by the internal mould insert 5 and the internal mould core fastening rack 41. Obviously, the internal mould core 4 may also be a one piece structure as illustrated in FIG. 1a.

The demoulding process in step 4) further includes the following steps:

step 4.1): the separable mould board (here is the front mould board 8 and the rear mould board 3) and the separable slide 7 (here is the lower front mould cavity 71 and the upper front mould cavity 72) separating at two sides along the direction lying vertical or approximately vertical relative to the axial direction of the mould cavity 1 (In FIG. 3, it is in up and down directions). At this moment, one part of the slide 7 (preferably the lower front mould cavity 71), the internal mould insert 5 and the internal mould core fastening rack 41 that move together, the mould cavity 1, the blowing-demoulding unit fastening board 16 and the blow needle secured above the same all together move in a downward direction. At this moment, the upper half part of the external mould surface 26 of slide 7 is exposed in the air. Then, the separable slide 7 (preferably the lower front mould cavity 71) that contacts with the silicone rubber cupping appliance separates in top and bottom with the silicone rubber cupping appliance (the specific form may be separating in top and bottom through the pushing rod 9 relative to the rear mould board 3, as illustrated in FIG. 3, obviously it may be in other forms), causing the external mould surface 26 (also includes the solidified silicone rubber in the hot flowing channel 27) of the slide of the silicone rubber cupping appliance to be totally exposed in the air.

Step 4.2) If the blowing-demoulding unit 6 includes the blow duct 21, blow duct opening 23 and the blow needle as illustrated in FIG. 4, under the situation of the internal mould core 4 is detachable and is formed by the internal mould core fastening rack 41 and the internal mould insert 5, the internal mould insert 5, the internal mould core fastening rack 41 and the solidified silicone rubber cupping appliance in the mould cavity 1 together move opposite relative to blow duct 21 that passes through the internal mould core fastening rack 41 and the internal mould insert 5 along the axial direction of the blow duct 21 (in FIG. 3, left and right directed motion is made under the effect of the pushing rod 9, obviously, it may be in motion under other forms of driven force), so that a gap is formed between the blow needle and the internal mould surface 25. The blow needle is distal from the internal mould surface 25, while it may be that the blow needle and the blowing-demoulding unit fastening board 16 being secured as the internal mould core fastening rack 41 and the internal mould insert 5 being in motion. It may also be that the internal mould core fastening rack 41 and the internal mould insert 5 being secured as the blow needle and the blowing-demoulding unit fastening board 16 being in motion. It may also be that the two are in motion simultaneously.

The demoulding process in step 4.3) and the cycle production process in step 5) are the same as those in the second embodiment.

The silicone rubber cupping appliance produced from the above mentioned device and method possesses high elasticity, high transparency and complex shapes. The silicone rubber cupping appliance that possesses elasticity may allow the realization of negative pressure production so as to be able to suck tightly to the skin without the need to lighting. The transparency may assist the medical practitioners to clearly observe the skin condition of the patients and allow the taking of appropriate therapeutic measures.

It should be emphasized that, the specific embodiments can allow the skilled in the art to be able to more comprehensively understand the application. However, these methods are not in any way serving as limiting the present application. Therefore, despite the present application describes the present invention in detail provided with embodiments and drawings, the skilled in the art should understand that any amendments or equivalent replacements towards the present application, or combinations of the embodiments of the present application with existing technology, while those technical solutions and improvements have not departed from the spirit and scope of the present application, shall all fall within the protection scope of the present application.

The invention claimed is:

1. A method for producing a silicone rubber cupping appliance using a device, the device comprising:
    a nozzle;
    an internal mould core;
    a separable slide comprising at least two separable slide blocks; and
    a blowing-demoulding unit;
    wherein a mould cavity used for moulding the silicone rubber cupping appliance is formed between the slide and the internal mould core;
    wherein one end of the nozzle is connected to a channel that transfers liquid silicone rubber material, another end of the nozzle is connected to the mould cavity; and
    wherein the blowing-demoulding unit is connected to the mould cavity through a blow duct opening which is set at a contact surface of the internal mould core and the mould cavity;
    the method comprising the following steps:
    1) heating the moulding zone which is at least formed by the slide, internal mould core and the mould cavity; at the same time cooling the channel that the liquid silicone rubber material must pass by and/or a zone surrounding the channel;
    2) injecting liquid silicone rubber material into the mould cavity;
    3) stopping adding material and keeping heat preserving for a duration of time; and
    4) separating the separable slide, at the same time opening the blow duct opening, and blowing the moulded silicone rubber cupping appliance in the mould cavity by the blowing-demoulding unit for demoulding;
    wherein the step 4) further comprises:
    4.1) separating the separable slide at two sides along a direction lying vertical or approximately vertical to an axial of the mould cavity, causing an external mould surface of the silicone rubber cupping appliance in the mould cavity to be exposed in air;
    4.2) opening the blow duct opening in the blowing-demoulding unit, causing the blow duct opening of the blowing-demoulding unit to be connected to the mould cavity; and
    4.3) letting the high pressure gas enter between the internal mould surface of the mould cavity and a solidified silicone rubber cupping appliance through the blow duct opening, and blowing away the solidified silicone rubber cupping appliance from the internal mould surface; and
    the method further comprises: repeating steps 2) to 4);
    wherein the channel that transfers liquid silicone rubber material comprises a cold flowing channel adapted to be cooled by cooled water from a cooled water channel; the blowing-demoulding unit comprises a blow duct and a blow needle; the blow duct opening is at an end of the blow duct and connects to the mould cavity; and the blow needle is located within the blow duct and controls opening and closing of the blow duct opening;
    the blow duct comprises a conical stand hole adjacent to the blow duct opening; a cross-sectional diameter of the conical stand hole in proximity to the blow duct opening is less than that of the conical stand hole distal from the blow duct opening;
    wherein the blow needle comprises a rod section and a top section in proximity to the blow duct opening; the top section is a conical stand with a same conical angle as the conical stand hole of the blow duct; and the top section adapts to engage tightly with the conical stand hole of the blow duct; and
    wherein during demoulding the separable slide separates, the blow needle departs from the mould cavity along the blow duct, thereby causing the blow duct opening to open and allowing high pressure gas to enter the mould cavity through the blow duct.

2. The method according to claim 1, wherein when the device further comprises a mould board which is configured to secure and/or enfold the slide or the internal mould core, and the mould board is separable, the step 4.1) is replaced by: separating the mould board, causing the separable slide separating at two sides along a direction lying vertical or approximately vertical to an axial direction of the mould cavity, allowing an external mould surface of the silicone rubber cupping appliance in the mould cavity to be exposed in air; and blowing out high pressure gas with a pressure of 6 atm-7.5 atm to an internal mould surface of the mould cavity.

3. The method according to claim 1, wherein the slide comprises a recess, the internal mould core comprises a projection, the mould cavity is formed between the recess and the projection.

4. The method according to claim 1, wherein the mould cavity is in a shape of a gourd, and the blow duct opening is connected to the mould cavity at a top central section of the gourd.

5. The method according to claim 1, wherein a hot flowing channel is provided on a flow channel that connects the nozzle and the mould cavity, and the hot flowing channel is formed at a contact surface between the slide blocks when the slide blocks are combined.

6. The method according to claim 1, wherein the blow duct is provided within the internal mould core; a top surface of the top section of the blow needle is in a shape that is aligned to or smoothly transitioned with the internal mould surface in proximity to the blow duct opening at the mould cavity.

7. The method according to claim 1, wherein the blowing-demoulding unit further comprises a gas entry channel that transports gas into the blow duct; one end of the gas entry channel is connected to a high pressure gas source through a gas entry opening, and another end of the gas entry channel opens within the blow duct.

8. The method according to claim 7, wherein the blow duct at external to the conical stand hole comprises a pipe channel including a section with a small diameter and a section with a large diameter; the section with the small diameter is in proximity to the conical stand hole; a sealing pad that prevents the high pressure gas from leaking is provided within the section with the large diameter; and a pore is provided at a center of the sealing pad.

9. The method according to claim 1, further comprising a mould board which is configured to secure and/or enfold the slide and the internal mould core and comprising at least one insulation board; wherein the mould board is separable; the slide, the internal mould core and the mould cavity form a mould zone insulated by the at least one insulation board.

10. The method according to claim 1, wherein the internal mould core is separable or detachable; the internal mould core comprises an internal mould insert and an internal mould core fastening rack; the internal mould core fastening rack comprises a slot which is correspond to the internal mould insert; the device further comprises a heating device that heats the liquid silicone rubber material for vulcanization moulding; the heating device is a heating pipe or a heating board; the blowing-demoulding unit blows out high pressure gas with a pressure of 6 atm-7.5 atm; and a number of the mould cavity is two or more.

\* \* \* \* \*